Figure 10:
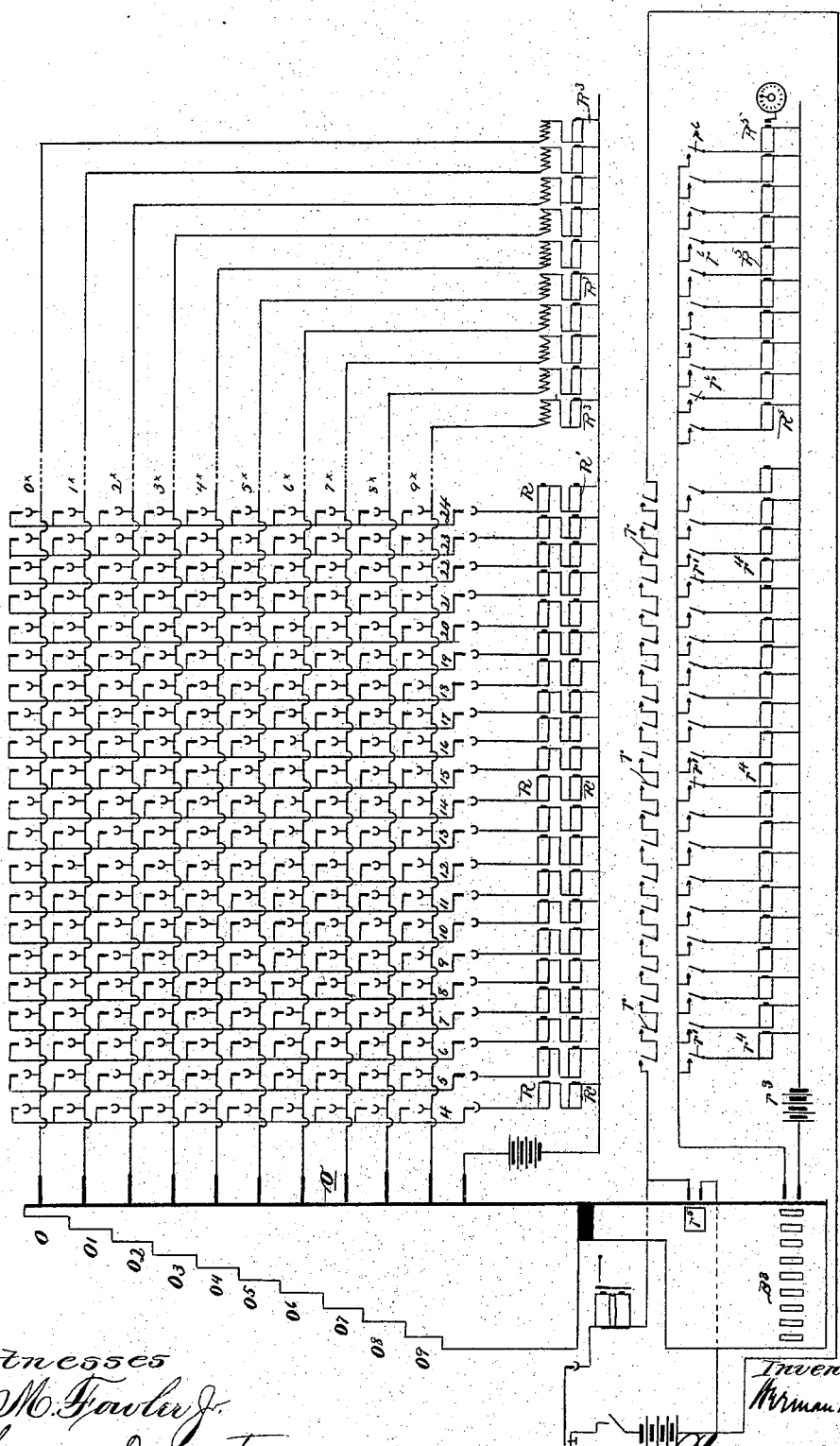

(No Model.)  9 Sheets—Sheet 1.
H. HOLLERITH.
TABULATING SYSTEM.
No. 518,885. Patented Apr. 24, 1894.
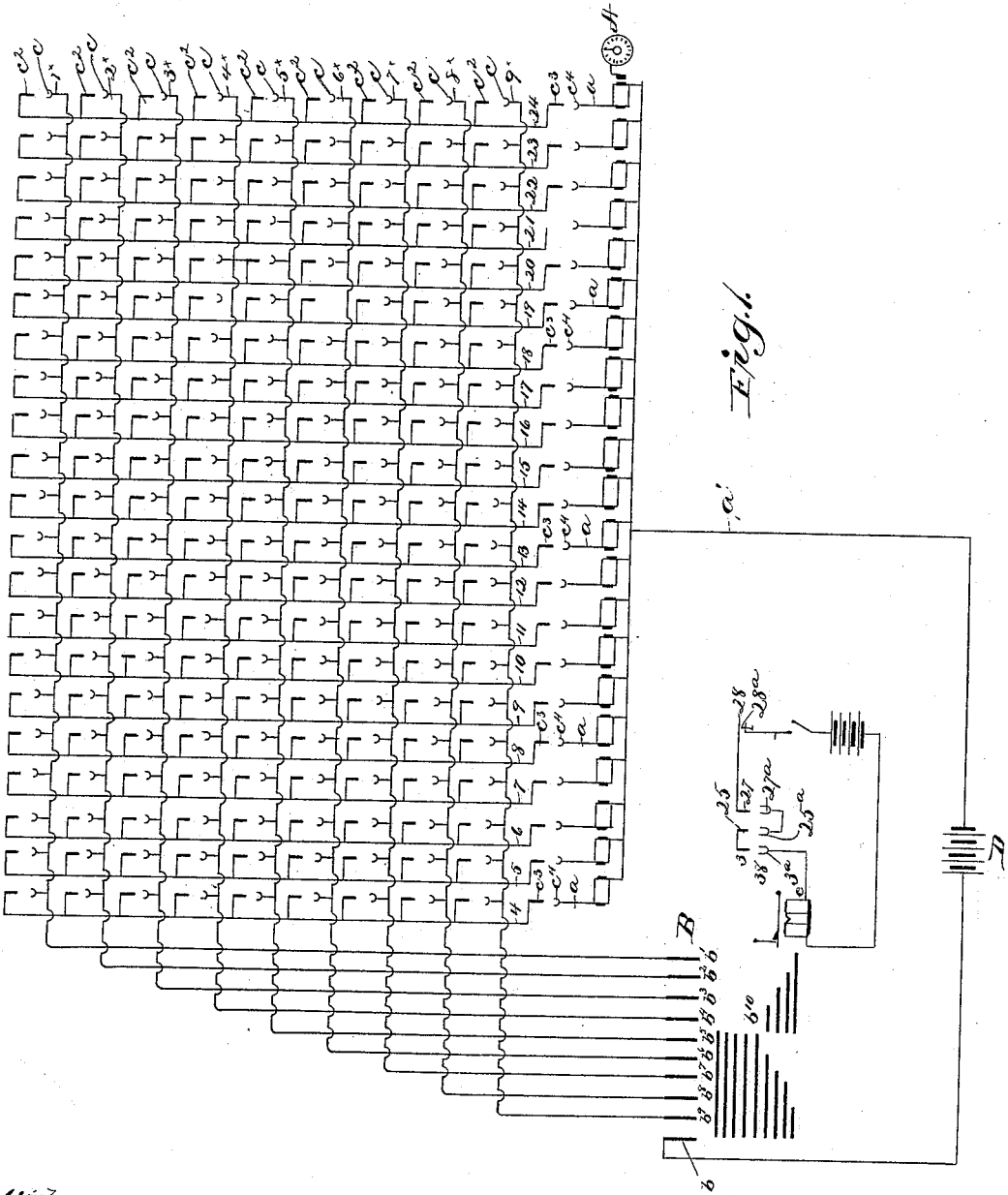
Witnesses:
J. M. Fowler Jr.
Thomas Durant
Inventor
Herman Hollerith
By Church & Church
His Attorneys.

(No Model.)
H. HOLLERITH.
TABULATING SYSTEM.
No. 518,885.
9 Sheets—Sheet 2.
Patented Apr. 24, 1894.
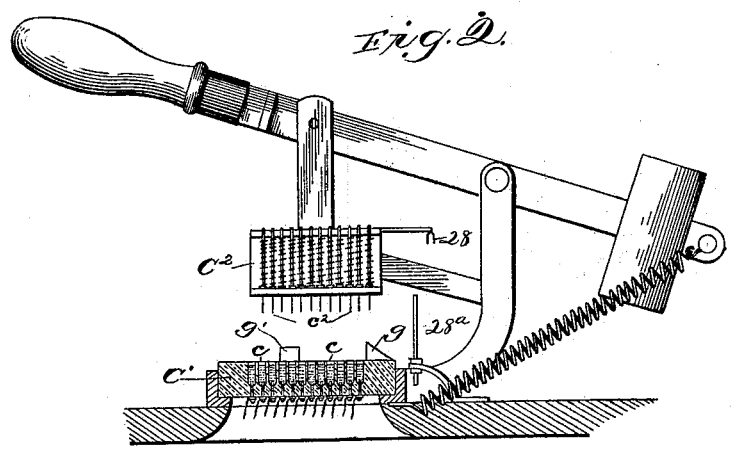
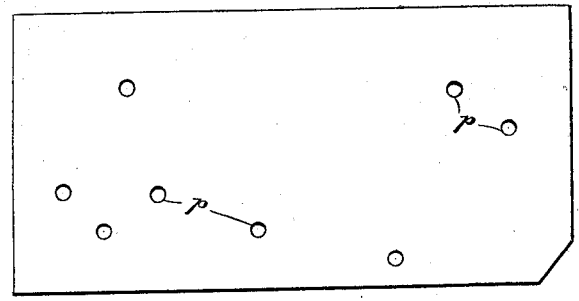
Witnesses
J. M. Fowler Jr.
Thomas Durant
Inventor
Herman Hollerith
By Church & Church
his Attorneys.
THE NATIONAL LITHOGRAPHING COMPANY,
WASHINGTON, D. C.

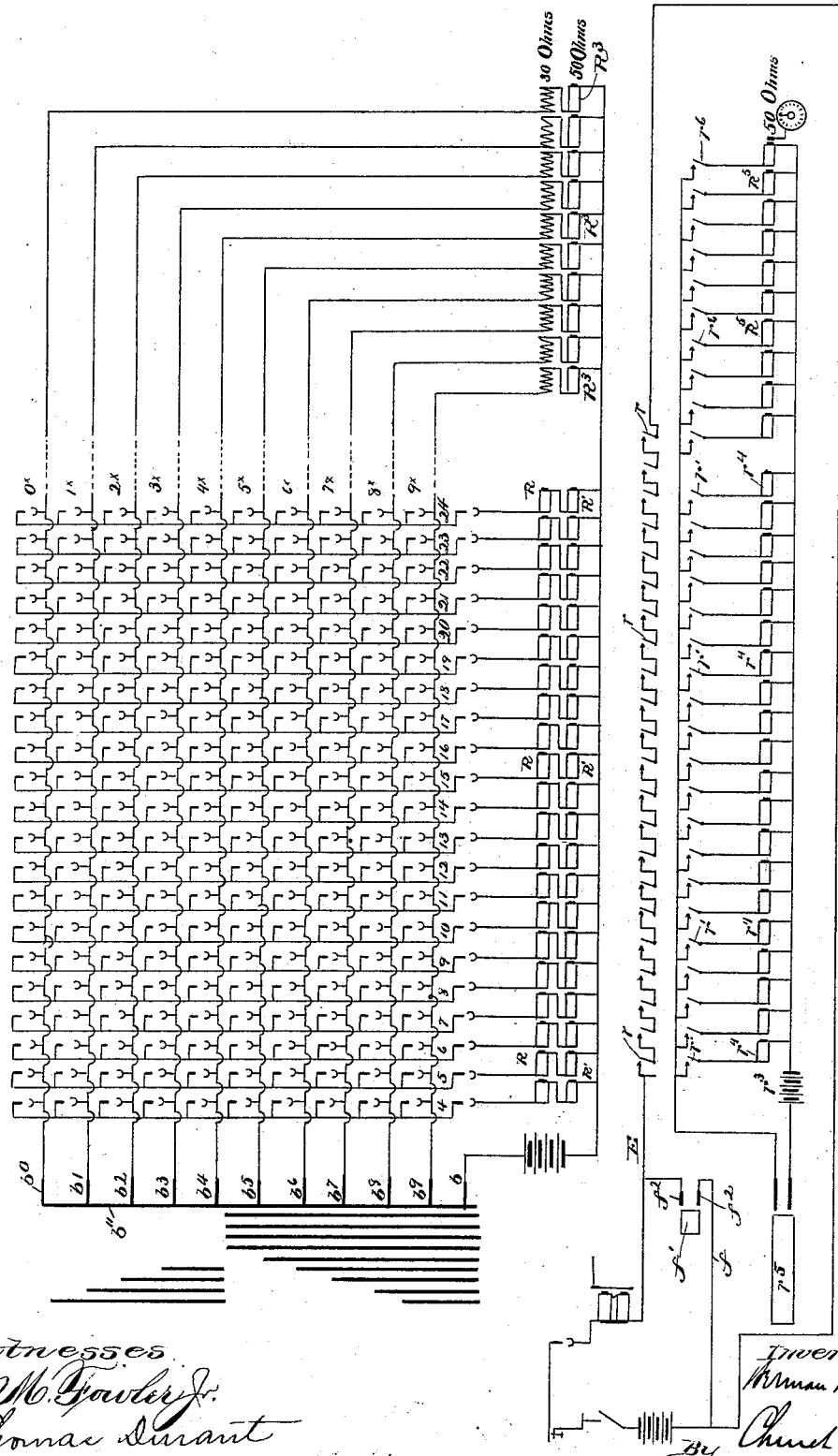

(No Model.)  H. HOLLERITH.  9 Sheets—Sheet 4.
TABULATING SYSTEM.
No. 518,885.  Patented Apr. 24, 1894.
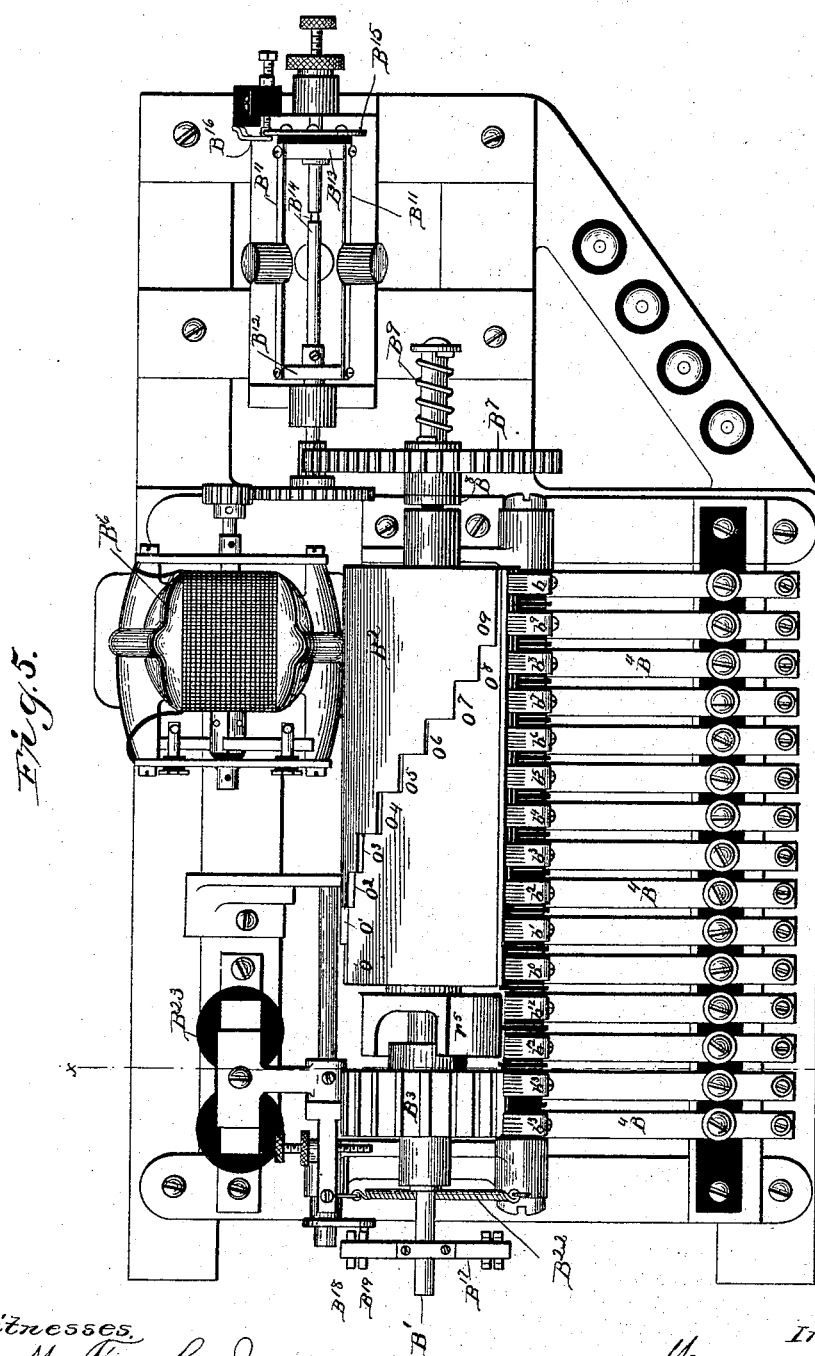

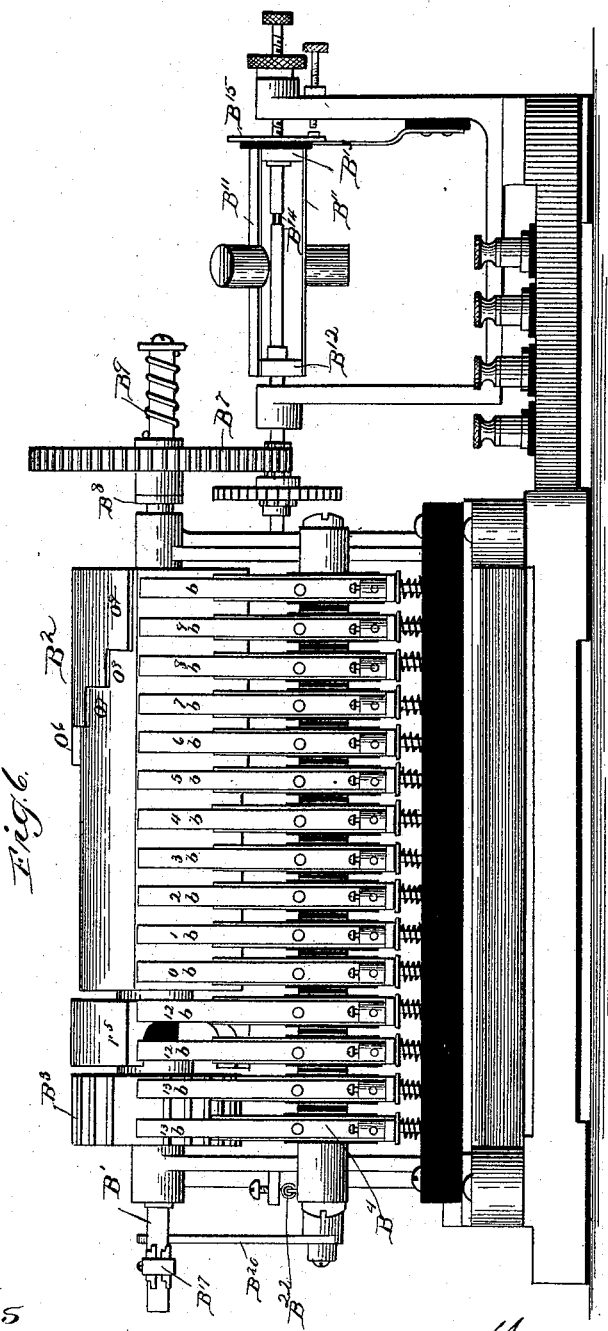

(No Model.) 9 Sheets—Sheet 6.
H. HOLLERITH.
TABULATING SYSTEM.
No. 518,885. Patented Apr. 24, 1894.
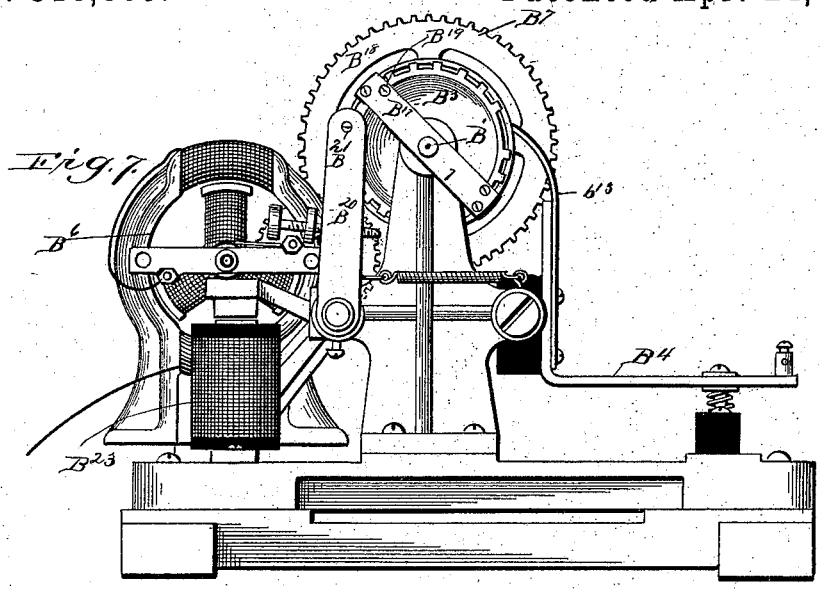
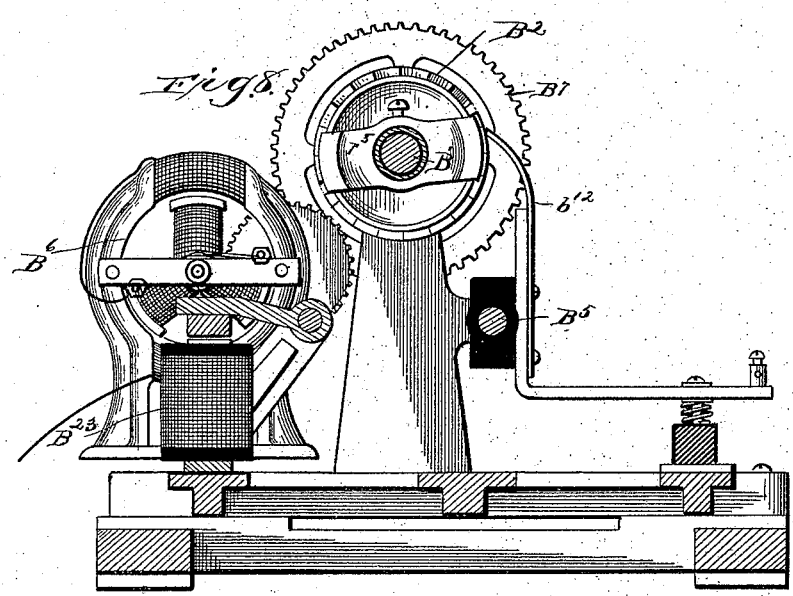

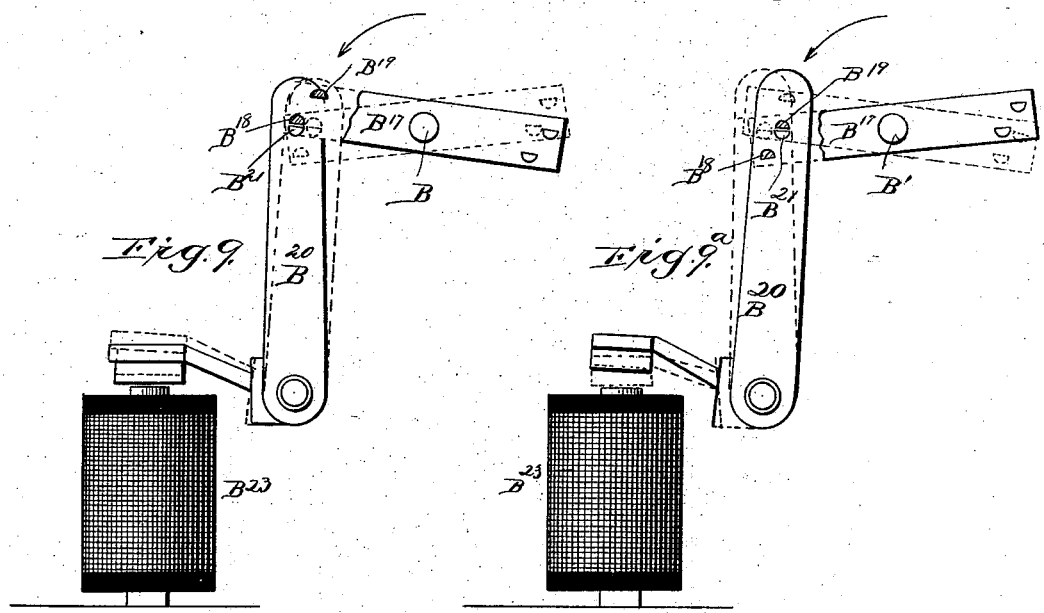

(No Model.) 9 Sheets—Sheet 8.
H. HOLLERITH.
TABULATING SYSTEM.

No. 518,885. Patented Apr. 24, 1894.

Witnesses
J. M. Fowler Jr.
Thomas Durant,

Inventor
Herman Hollerith
By Church & Church
his Attorneys (No Model.) 9 Sheets—Sheet 9.

Figures 11, 12, 13:
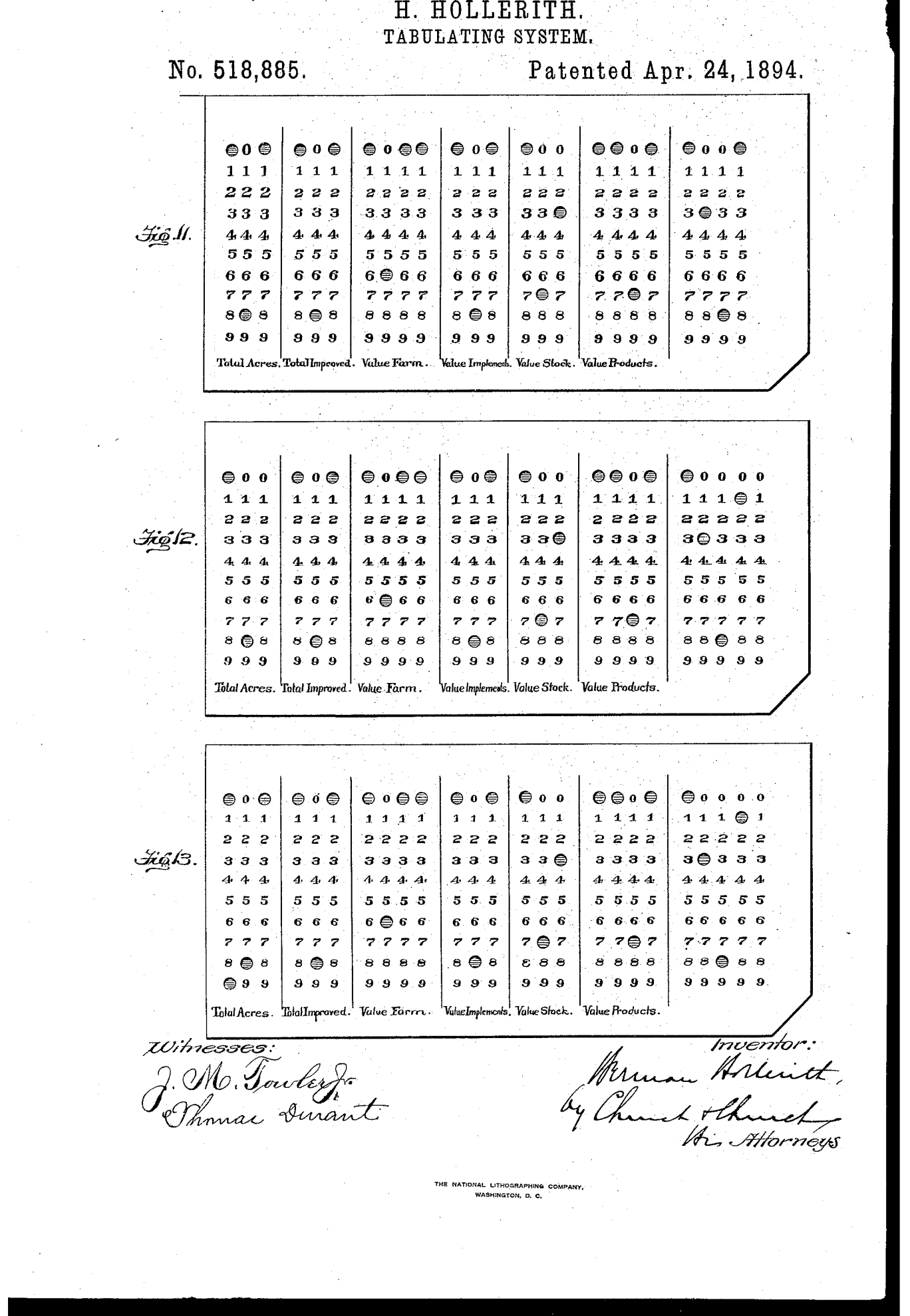

H. HOLLERITH.
TABULATING SYSTEM.

No. 518,885. Patented Apr. 24, 1894.

Witnesses: J. M. Fowler Jr., Thomas Durant

Inventor: Herman Hollerith, by Church & Church, His Attorneys

UNITED STATES PATENT OFFICE.

HERMAN HOLLERITH, OF WASHINGTON, DISTRICT OF COLUMBIA.

TABULATING SYSTEM.

SPECIFICATION forming part of Letters Patent No. 518,885, dated April 24, 1894.

Application filed August 1, 1893. Serial No. 482,097. (No model.)

*To all whom it may concern:*

Be it known that I, HERMAN HOLLERITH, of Washington, District of Columbia, have invented certain new and useful Improvements in Tabulating or Calculating Systems; and I do hereby declare the following to be a full, clear, and exact description of the same, reference being had to the accompanying drawings, forming a part of this specification, in which—

Figure 1 is a diagrammatic view of one of the primary embodiments of my system. Fig. 2 is a vertical sectional view of the switch mechanism, the record card being omitted. Fig. 3, is a plan view of a record card. Fig. 4 is a diagrammatic view illustrating another embodiment of the system; Fig. 5, a top plan of an improved form of integrator mechanism; Fig. 6 a front elevation; Fig. 7 an end elevation, and Fig. 8 a cross sectional view of the same on line $x$—$x$ Fig. 5. Figs. 9 and $9^a$ are detail views of a portion of the detent mechanism. Fig. 10, is a diagrammatic view illustrating the application in the system of the improved integrator mechanism shown in Figs. 5 to 9. Fig. 11 is a plan view of a properly punched record such as designed for use in connection with the embodiments of the system shown in Figs. 4 and 10. Fig. 12 is a plan view of a record card which has been insufficiently punched. Fig. 13 is a similar view of an overpunched card.

I have invented what I believe to be certain novel and highly useful improvements in tabulating or calculating systems, and in order that the higher developments of the invention may be more readily apprehended, I will premise by describing one of its primary forms, reference being had, for this purpose, to Figs. 1 to 3, of the accompanying drawings.

This embodiment of my invention, shown in said figures involves the use of the following instrumentalities: first, a series of independent electrically controlled counters or registers and appropriate circuit connections; secondly, an integrator capable of producing in each series of circuit connections leading therefrom a different number of electrical impulses or interruptions; thirdly, a switch mechanism controlling communication between the several circuit connections leading from the integrator and the circuit connections leading to the several counters or registers; and, fourthly, an actuating or master circuit closed by the movement of the switch mechanism, and controlling the starting and stopping of the integrator.

The switch mechanism as shown in Figs. 1 and 2 comprises a fixed bed plate $C'$ provided with insulated contacts or terminals $c$ in the form of mercury cups or equivalent contacts, and a movable platen, or what I prefer to call "pix box" $C^2$ carrying yielding pins or contacts $c^2$. The pin box is provided with suitable guiding and supporting means, and is held normally elevated, while a lever or other actuating device is provided for depressing it to bring the contacts $c^2$ into engagement with the contacts $c$.

The connections to be made through the switch mechanism are regulated and determined by a record card or strip—Fig. 3—provided with perforations ($p$) disposed according to a prearranged plan, interposed between the fixed and movable sections of the switch mechanism, so that, as the movable section or pin box is depressed, only those of the movable contacts or pins $c^2$, which descend in line with the perforations $p$ in the record card will be permitted to pass through the card and engage with their co-operating contacts $c$ in the bed plate and thus close the circuits with which they are connected, all other contacts $c^2$ being held back and their circuits kept open by the bodily interposition of unperforated portions of the record card or strip as will be readily understood. The contacts $c$ are electrically connected in groups $1^\times$ to $9^\times$ inclusive (see diagram Fig. 1) and the contacts or pins $c^2$ are also connected in groups numbered 4 to 24 inclusive, arranged at right angles to the groups $1^\times$ to $9^\times$, there being at least nine contacts in each group, so arranged and disposed that one contact $c^2$ of each of said groups 4 to 24 will be opposite one contact $c$ of each group $1^\times$ to $9^\times$. Each group of contacts $1^\times$ to $9^\times$ is connected to one of the contacts or brushes $b'$ to $b^9$ of the integrator B, Fig. 1, while each group of contacts 4 to 24 is connected to one of the counters or registers A through the circuit connection $a$ leading to the magnet of said counter or register, the magnets of all the registers being connected to a common return conductor $a'$ having in terposed in it a generator D and terminating in a contact or brush $b$ at the integrator.

Instead of forming permanent connection between groups 4 to 24 (the movable contacts of the switch) and the several register circuit connections $a$ (as might be done) the former preferably terminate in pins or contacts $c^3$ carried by the movable pin box and co-operate with contacts $c^4$ in the bed plate, said contacts lying outside the record card when the latter is in position, so as to always close the circuits whether any of the other contacts in the same group are permitted to pass the card or not.

The movable pin box is provided with four additional or supplemental contacts 3, 25, 27 and 28, (Fig. 1) of which the first three have to do with the proper location of the record cards on or in the switch mechanism. Contacts 3 and 25 occupy positions along one edge of the pin box, opposite the side gage or gages $g\ g$, and just beyond the margin of the record card when in position; while contact 27 is located at one end just beyond the record card opposite the end gage $g'$. As thus arranged if the record card is properly located it will not interfere with the descent of any of the contacts, but if shifted out of proper position, it will lie in the path of one or more of the contacts, and prevent further advance on the part of the contact thus engaged. These three contacts 3, 25 and 27 are located in the same circuit and all three must be in contact with the opposite electrodes or contacts $3^a$ $25^a$ and $27^a$ to close the circuit, hence if any one is held back the circuit will remain open and the apparatus inactive, inasmuch as said contacts are located in what may be termed a master or starting circuit, which, in the present instance, includes the devices for setting in motion the integrator through which the several operating circuits extend. The contact 28 is also carried by the movable pin box and co-operates with the contact $28^a$ on the base; it, too, is located in the master circuit and is adjusted to effect the final closing and first opening of the circuit in which it is located, so that all the sparking in that circuit will occur at this one point where it can be most easily controlled and its injurious effects provided against.

The integrator B (shown diagrammatically in Fig. 1) is an apparatus for producing in each of a series of circuit connections leading to groups $1^\times$ to $9^\times$ a different series of electrical impulses of such form, duration and character as to affect the registering devices to advance them as many steps or units as there are electrical impulses sent over the particular circuit at the time including the particular register. In the example given, contacts or brushes $b'$ to $b^9$, inclusive, are the terminals of the groups of contacts $1^\times$ to $9^\times$ and they are arranged to be engaged intermittingly by a series of contacts or bars $b^{10}$, mounted upon a rotating cylinder driven by a suitable motor and provided with a detent mechanism, the latter controlled by a magnet $e$ in the master or starting circuit. A contact or brush $b$ forming one terminal of the generator circuit is also arranged to engage each of the contacts $b^{10}$, thereby completing the circuit through the latter and each of the contacts $b'$ to $b^9$. The contacts or bars $b^{10}$ are so arranged and disposed upon the cylinder that during a complete movement of the latter, i. e., a complete or partial rotation, contact or brush $b'$ will be engaged by but one of said contacts $b^{10}$; contact or brush $b^2$, by two contacts; $b^3$ by three, and so on throughout the series, the last contact or brush $b^9$, being engaged by nine contacts $b^{10}$.

The ultimate effect produced by one complete movement of the integrator is as follows: The master circuit being closed, the integrator cylinder is started and the current entering through contact or brush $b$, passes successively, through the contacts or bars $b^{10}$ to contacts or brushes $b'$ to $b^9$, and each of said last named contacts receives a different number of electrical impulses, from 1 to 9. If, now, any of the circuits through the switch mechanism be closed through the registers or counters, the latter will be advanced as many points as there are pulsations produced in its circuit, and the number of pulsations will be governed by the record card in placing any one of the contacts $b'$ to $b^9$ in communication with that particular register. It will be observed that the contacts of each group of contacts $1^\times$ to $9^\times$ can be placed in communication with the contacts of any one or more of the groups of contacts 4 to 24 thus closing circuit connections through one or more of the register magnets, and that each group of contacts $1^\times$ to $9^\times$, through its connections with the integrator, receives and transmits a series of electrical pulsations corresponding to the assigned value of the group. Assuming, for the purpose of illustration, that the series of items embraced but the three groups of contacts 4, 5 and 6 (the number of contacts 4 to 24 apportioned to any given series of calculations being a matter of choice) and that the value to be registered or added is 562, the record card will be perforated at the fifth division from the top in the column corresponding to group 4, in the sixth division of group 5 and in the second division of group 6. The card having been properly located on the platen, when the pin box is brought down the circuit connections will be closed through the register magnets and integrator, and five pulsations will be sent through the register magnet belonging to group of contacts 4, six pulsations will be sent through group 5 and two through group 6, each register being advanced the number of digits represented by the perforations in the column of the record card belonging to that particular register. If the record card is not placed fairly in position on the bed plate so that the contacts 3, 25 and 27 will pass the edges, one or more of said contacts will engage the card, thereby preventing the closing of the master circuit and the starting of the integrator, which fact will be observed by the operator who will thus be admonished that the record card is not properly adjusted. A check is thus provided for one source of errors, those liable to arise from the failure to properly position the record card so as to bring the several divisions in register with the contacts of the pin box, and if the records made on the record cards were absolutely accurate the system thus far described would be adequate for most purposes. But in actual operation it has been found that there are certain difficulties arising mainly from carelessness or inaccuracy on the part of the operator in preparing the record cards. First. The clerk whose duty it is to prepare the record card may fail to punch some of the digits representing items or values entering into the computation. Second. Two or more holes may be punched in one column (each column representing one of the groups of contacts 4 to 24) and none in another. Third. The card may be placed in the machine crooked, or the holes be punched out of position so that some pins which ought to go down will be held up, thus causing a failure to register. Fourth. Some pin or pins in the pin box may be broken or stuck, thereby preventing the closing of one or more of the circuits designated by the holes in the record card. Fifth. Two holes may be punched in one column while at least one hole is punched in every other column. Experience has amply demonstrated that these are not imaginary, but are actual difficulties certain to occur in practice, and are productive of serious results, so far as accuracy is concerned. In the first place, the omission of holes that should have been punched, the presence of broken pins, or the sticking of the pins, &c., will affect the results by the omission of a corresponding amount, i. e., the value of the items not registered. When, however, two or more holes are punched in one column a rather startling result will be obtained. Suppose, for example, a hole is punched in every column corresponding to the value 1. Each counter should and ordinarily would register 1. If, however, in any column an additional hole is punched representing a higher value so as to make two holes in one column—then each counter instead of registering 1 will register according to the value of the additional hole of higher value. To illustrate: Suppose a hole is punched in the first and ninth divisions of the first column connecting groups $9^x$ and 4 (see Fig. 1), nine impulses will be transmitted through the register magnet and the counter will be advanced nine points. If, at the same time, a hole is punched in the first division of the second column so that groups $1^x$ and 5 will be connected, the magnet of the register belonging to the second column or group 5 instead of receiving one impulse only, as it should, will receive nine impulses, because the current transmitted through contact or brush $b^9$ will be conducted from group $9^x$ through group 4 to group $1^x$ and thence to group 5 and to the register magnet. Thus, the pulsations or impulses delivered to group $9^x$ from contact or brush $b^9$ and designed to influence only such of the register magnets as are connected by holes in the ninth divisions of each column or group 4 to 24, are diverted onto the group $1^x$, by the perforation in the first division, and are transmitted to all register magnets at the time connected with a contact in group $1^x$ through a hole in the first division. It will be seen that if 1 and 9 be punched in any one column, every other 1 in the other columns will register 9, be it units, tens, thousands or millions. A corresponding improper registration will take place upon the forming of multiple holes in any column of the record card, the hole of higher value always dominating. With a view to overcoming the defects noted and thereby eliminating those errors due to the inaccuracy of the person who prepares the record card or strip, I have devised and invented certain improvements in the nature of modifications and extensions of the primary system, and especially designed first to prevent the registration of cards not containing at least one hole in each column, thus requiring the punching of a hole in each column in order to effect any registration whatever; and, secondly, to indicate a mistake resulting from double punching or the punching of more than one hole in any column of the card, thereby enabling a timely correction of the error to be made.

The improvements designed to detect record cards in which each column is not represented by at least one punched hole, or, in other words, to detect record cards bearing incomplete records will first be described. As may already have been anticipated, this feature of my invention is based upon and involves the punching of at least one hole in every column of the record card whether the hole punched represents a value to be registered or not, thus requiring that a hole be punched at some point in each column in order to render the card, as a whole, operative to actuate the registering mechanism. In carrying this idea into practice the first step involved is the provision of an additional series of divisions on the card (by divisions I mean prearranged locations on the card apportioned among the various items or series of items designated by the punched holes) one for each column representing say, 0, (see Figs. 11, 12 and 13,) which additional division or 0, is designed to be punched whenever there is no value to be recorded in the particular column. Thus if 60 is to be recorded on the card, the sixth division in the tens column will be punched and there being nothing in the units column to be recorded instead of skipping that column as heretofore, the 0 therein will be punched.

The next step is the provision of an additional group of contacts $0^\times$ in the pin box (see diagrammatic view, Fig. 4) and the addition of one co-operating contact to each of the series of groups of contacts 4 to 24. These represent the additions to the switch mechanism. Such additions are not designed to directly affect the operator of the registers or counters, but merely the master circuit which controls the starting of the integrator, as will hereinafter more fully appear. The master circuit E includes a series of relay contacts $r$ (Fig. 4) one for each group of contacts 4 to 24 and said relay contacts are controlled by relay magnets R connected in circuit with said series of groups of contacts, there being one such relay magnet and relay contact for each of said group of contacts.

To start the integrator the master circuit must be closed, and this can only occur when all the relay contacts are closed, hence if the circuit to any one or more of the relay magnets is not established, the master circuit will remain broken at one or more points, and the integrator will be prevented from being started when the pin box is depressed. The closing of the relay circuits requires that at least one hole should be punched in each column, and the omission to so punch each column will be at once indicated by the failure of the integrator to start when the pin box is depressed.

It is necessary that the switch mechanism should be so connected up with the battery that upon the descent of the pin box each group of contacts $0^\times$ to $9^\times$ will be in condition to close the circuits through the holes in the card and the series of groups of contacts 4 to 24, and this can conveniently be effected by providing the integrator with a contact or bar $b^{11}$ so located and arranged that when the integrator is at rest, at the starting point, the several contacts or brushes $b^0$ to $b^9$ will rest upon said bar $b^{11}$ and be in circuit with the battery through contact or brush $b$. Assuming now that a record card properly punched with a single hole in each column, as shown in Fig. 11, is properly placed upon the bed plate, and that the pin box is brought down a pin in each of the groups of contacts $0^\times$ to $9^\times$, Fig. 4 will pass through the holes in the card and make contact with one or the other of the contacts in each of the series of groups of contacts 4 to 24, the result being the energizing of all the relay magnets R, the closing of all the relay contacts $r$, the completion of the master circuit E, the energizing of the starting magnet, the withdrawal of the detent from the integrator cylinder and the advance of the integrator cylinder under the influence of its motor or prime mover. Should, however, a card be introduced in which there has been a failure to punch a hole in one or more of the columns (as illustrated by the card in Fig. 12) or should any pin opposite one of the punched holes be stuck or broken, the bringing down of the pin box would fail to operate one or more relays, and this master circuit being thus left open at one or more points, the starting magnet would not be energized and the integrator would not be operated. As soon as the master circuit is closed through the series of relay and other contacts and the integrator commences to move, the contact bar $b^{11}$, through which all of the series of groups of contacts $0^\times$ to $9^\times$ are placed in communication with the battery, is withdrawn from the contacts or brushes $b^0$ to $b^9$, thus opening all the circuits through the switch mechanism, the continued movement of the integrator then operating to produce the electrical impulses in the circuits connected to contact strips $b'$ to $b^9$, the contact strip $b^0$ not being re-engaged till the integrator again reaches first position. With this arrangement, if the pin box remained depressed until the bar $b^{11}$ again engaged the contact strips and closed the circuits through the switch mechanism, the detent would be a second time withdrawn, and the described operation of the apparatus repeated. To prevent this reregistration by the same card, the detent mechanism is provided with a second stop for arresting the movement of the integrator just before the bar $b^{11}$ is brought into position to close the circuits through the switch mechanism, and this second stop is brought into action by closing the master circuit through a branch $f$ which is closed by a contact $f'$ mounted upon the integrator cylinder or otherwise moved in unison with it and engaging two brushes $f^2 f^2$ constituting the terminals of the branch circuit. This second detent serves to hold the integrator stationary so long as the master circuit remains closed through the branch $f$ and until the pin box is elevated, breaking the master circuit and permitting the integrator to advance to the second detent, when the contact or bar $b^{11}$ will again engage the contacts or brushes $0^\times$ to $9^\times$, but no current will flow through the circuits owing to the elevation of the pin box. During this movement the branch circuit $f$ is again opened, to be closed only after the integrator has been set in motion and has nearly reached the limit of its movement.

It will be observed that the circuits through the switch mechanism are utilized in controlling the starting of the integrator, the record card itself being the principal element in determining whether or not such starting shall take place. Provision having thus been made for starting the integrator, the registering of the various items designated on the record card may be effected as follows: Interposed in the circuit connection of each of the groups of contacts 4 to 24 is a second relay magnet R'. Each of these relay magnets R' controls a relay contact $r'$ in a circuit including a generator $r^3$, a register magnet $r^4$ and a circuit closing device $r^5$. For convenience, the several relay contacts and their register magnets are arranged in multiple arc with a single generator $r^3$ and circuit closer $r^5$, the arrangement being such that when the circuit closer closes the circuit and one or more of the relay contacts is or are closed, the register magnet or magnets of the closed relay contact or contacts will be energized and the register or registers operated once for each closure. Inasmuch as the relay magnets $R'$ are arranged in the same circuits with the relay magnets R, which latter effect the starting of the integrator, provision is made for preventing the movements of the registering devices when the circuits through the switch mechanism are closed for starting the integrator, and in the present instance this is accomplished by the employment of the circuit closing device $r^5$ which operates to connect the several register magnets with the generator when their relay contacts are closed. To this end the circuit closing device $r^5$, in the form of a contact strip is arranged to move in unison with the integrator cylinder and is so located with relation to the contact bar $b^{11}$ that when the latter is in engagement with the contacts or brushes $b^0$ to $b^9$ the circuit including generator $r^3$ will be open and no current can pass through the register magnets when their relay contacts are closed. After the integrator has been started and contact bar $b^{11}$ has been withdrawn, and before the integrator contacts or bars $b^{10}$ are brought into action to send electrical impulses through the switch mechanism, the circuit closing device $r^5$ engages or closes the circuit connections leading to battery $r^3$ and holds said circuit closed while the integrator contacts or bars $b^{10}$ are acting, thereby placing the battery $r^3$ in communication with the several register magnet circuits so that each time the relay contacts are closed an electrical impulse will be transmitted through the register magnet. The circuit closer $r^5$ opens the circuit or disconnects the battery after the last integrator contact or bar $b^{10}$ passes beyond the contact strips $1^x$ to $9^x$, and before the latter re-engage the contact or bar $b^{11}$. The integrator having been started, as hereinbefore explained, each relay magnet $R'$ closes its relay contact as many times as there are electrical impulses transmitted from the integrator through the circuit closed through the switch mechanism including the particular relay magnet; and the number of pulsations or impulses transmitted through any one of the relay magnets $R'$ is determined entirely by the location of the hole in record card through which any contact in groups $1^x$ to $9^x$ is connected to any contact in the groups 4 to 24.

It will be noted that in the first described embodiment of my invention the electrical impulses or pulsations which directly affect the register magnets are transmitted by the integrator through the circuits of the switch mechanism; and in the second or later described embodiment such impulses or pulsations are likewise transmitted through the circuits of the switch mechanism, but instead of acting directly upon the register magnets, operate through relays to open and close a local circuit in which the register magnets are interposed. I prefer however to employ an integrator mechanism by which the circuits through the switch mechanism will be held closed, and the relays will operate to close local circuits through which a predetermined number of electrical impulses are transmitted for the purpose of energizing the register magnets. Such mechanism is represented in Figs. 5 to 9, inclusive and diagrammatically in Fig. 10. Upon a shaft $B'$ is mounted a cylinder provided with a stepped or graduated plate of conducting material $B^2$. Upon the same shaft, but insulated therefrom and from each other, are mounted the contact plate $r^5$ and a circuit breaking wheel $B^3$. Independent insulated brush holders $B^4$ are mounted upon a rod $B^5$, and each of said brush holders is provided with a limiting screw and a spring for adjusting it in proper position. The contacts or brushes $b$ $b^0$ to $b^9$ are secured to this series of brush holders, and in addition thereto two pairs of contacts or brushes $b^{12}$ and $b^{13}$ are provided, the brushes $b^{12}$ representing terminals of the branch $f$ of the master circuit, while the brushes $b^{13}$ $b^{13}$ form terminals of the register circuit.

The circuit breaking wheel $B^3$ is formed or provided with a series of nine teeth or projections, and the conducting plate $B^2$ is formed of varying width in the direction of the motion of said plate, so that the several contacts or brushes will remain in contact with said plate during a longer or shorter interval; thus, the contact or brush $b^0$ co-operates with the narrowest portion 0, the contact brush $b'$ with the next under portion $0'$ and so on throughout the series except that the brushes $b^9$ and $b$ both engage the widest section $0^9$.

The motor device preferably employed for actuating the integrator is an electric motor $B^6$ designed to run continuously so as to furnish a constant source of power, said motor being connected to the integrator shaft through a suitable train of gearing and a friction driver represented in this instance by the gear $B^7$ whose hub is held against a fixed collar $B^8$ on the shaft by an adjustable tension spring $B^9$, so that when the integrator shaft is arrested the gear $B^7$ will continue to be driven by the motor, but be always ready to rotate the shaft when the latter is released.

In order to impart steadiness to the running of the motor it is preferably provided with a governor consisting essentially of a series of spring arms $B^{11}$ weighted at their middles, and connected at one end to a fixed head $B^{12}$ and at the opposite end to a head $B^{13}$ movable upon a shaft $B^{14}$ connected to the gear train, said movable head carrying an insulated disk $B^{15}$ which, when the governing weights are thrown outward, engages a contact arm $B^{16}$ included in the master circuit, and operates to break or weaken said circuit, thereby interrupting or diminishing the power of the motor and slackening its speed until the circuit is again established.

The detent mechanism comprises an arm or projection $B^{17}$ upon the shaft $B'$, said arm being provided with two stop pins or shoulders $B^{18}$ $B^{19}$ arranged at different distances from the shaft and one slightly in advance of the other. An arm $B^{20}$ provided with a pin or shoulder $B^{21}$, (moved in one direction by a spring $B^{22}$ and in the opposite direction by the electro-magnet $B^{23}$ in the master circuit), is so arranged that its shoulder $B^{21}$ will alternately engage the stop pins or shoulders $B^{18}$ $B^{19}$, that is to say, when the arm $B^{20}$ is carried to one position by the energizing of the magnet $B^{23}$, its shoulder $B^{21}$ will stand in the path of the pin or shoulder $B^{18}$ and arrest the shaft; and when the master circuit is broken and the magnet de-engergized the spring will retract the arm, removing its shoulder from in front of pin or shoulder $B^{18}$, and carrying it into the path of the more rearward pin on shoulder $B^{19}$, whereupon the shaft will be advanced slightly under the influence of the motor until said pin $B^{19}$ engages the shoulder on the arm, where it will remain until the magnet $B^{23}$ is again energized by the closing of the master circuit for starting the integrator.

I would here state that the base or foward edge $o$ of the conducting plate $B^2$, Fig. 10, performs the functions of the conducting bar $b^{11}$ of the integrator represented in Fig. 4, that is to say, it connects the battery through contact or brush $b$, with each of the contacts or brushes $b^0$ to $b^9$, so that each group of contacts $0^\times$ to $9^\times$ may be placed in communication with one of the relays R, through the holes in the record cards for closing the master circuit and starting the integrator. The narrowest portion 0 of the plate $B^2$ is of such width that it will be moved out of contact with the contact strip or brush $b^0$ before the brushes $b^{13}$ $b^{13}$ are engaged by the first tooth of the circuit breaking wheel $B^3$, consequently the circuit including brush $b^0$ is broken before the first impulse is sent through the register circuit. The circuits through contacts or brushes $b'$ to $b^9$ remain closed so long as the said brushes bear upon the conducting plate $B^2$, and the circuits are broken successively after the passage of each tooth of circuit breaking wheel $B^3$, that is to say, the brush $b'$ remains in contact during the passage of the first tooth, the brush $b^2$ remains in contact during the passage of two teeth, and so on throughout the series, the brush $b$ retaining contact until the end of the plate is reached. It will thus be seen that the group of contacts $1^\times$ (see Fig. 10) will be connected to the battery while one impulse is being sent through the register circuit, after which said group will be cut out and those relays which are in communication with said group of contacts through perforations in the record card will be caused to open the local circuits, thereby preventing the passage of the next succeeding impulse from battery $r^3$ through said local circuit. Those circuits which are closed through the switch mechanism and include the contact strip or brush $b^2$ will remain closed and their relays will hold the local register circuits closed while two impulses are being sent through the register circuit, after which the circuits including the group of contacts $2^\times$ will be cut out and the local register circuits controlled by the relays will be broken. Thus after the passage of each tooth of the circuit breaking wheel $B^3$ one of the groups of contacts $b'$ $b^9$ will be disconnected from the battery and such of the relays as are at the time connected in circuit will be operated to open its local register circuit and thus prevent the passage of any greater number of electrical impulses than are assigned to the particular group $1^\times$ to $9^\times$ which is cut out by the passage of its contact or brush $b'$ to $b^9$ from off the conducting plate $B^2$. The contact plate $r^5$ is arranged to engage the brushes $B^{12}$ before the circuit breaking wheel has completed its movement and it operates to energize the starting magnet $B^{23}$ in the master circuit to arrest the movement of the integrator shaft as the circuit breaking wheel completes its motion thereby holding the integrator stationary after a complete registration has been effected and until the master circuit is broken by raising the pin box, when the integrator will be again advanced to the second stop $B^{19}$ in position to be again operated and the brushes $b^{12}$ will pass off the contact $r^5$.

I have described but a single conducting plate $B^2$, a single contact plate $r^5$, a circuit breaking wheel having only one series of nine teeth and but a single arm $B^{20}$ with its two stops $B^{18}$ $B^{19}$ but it is obvious that these parts may all be arranged in duplicate and I have so shown them in the drawings Figs. 5 to 9.

Reference was made in the earlier part of this specification to a further improvement or extension of my system designed to detect the presence of a record card bearing duplicate holes in any one column, and I will now proceed to describe at length this feature of my invention. Such an overpunched card is shown in Fig. 13 where two holes are indicated in the first column. It will be observed, that each contact or brush $b^0$ $b^9$ either produces or controls the production of a different series of electrical impulses in the registering circuits, the series running from 0 to 9. For each of said brushes a separate telltale register is provided upon which is registered the number of impulses produced or controlled by that brush, whether said impulses so produced or controlled operate the other registers of the system or not. As also hereinbefore explained, whenever a card having two holes punched in any one column is acted upon, the pin passing through the hole of higher value will carry the current through the group of which it is a member to the pin passing through the hole of lower value and thence to one of the groups of contacts $0^\times$ to $9^\times$, thereby increasing the number of pulsations produced or controlled by said group of contacts of lower values and, to the extent of the increase, augmenting the number of points which should be registered by the register corresponding to the hole of lower value. This defect is common to both the systems described, that is to say, the system having the register magnets in the circuits of the switch mechanism and the system in which the registers are arranged in local circuits with relays in the circuits of the switch mechanism.

Now, when such a false or improper registration is made the fact is indicated upon the tell-tale registers, I have referred to, that is to say, the tell-tale register belonging to the group of contacts into which the current has been diverted instead of indicating the number belonging to that group, or a multiple thereof, will indicate an increase equal to the difference between the number belonging to that group and the number of the group of higher value. For example, the tell-tale register belonging to group of contacts $0^\times$ will normally make no registration; that belonging to group $1^\times$ will indicate one point for each operation of the integrator; that belonging to group $2^\times$ will indicate two points and so on, throughout the series, the tell-tale register of group $9^\times$ indicating nine points. If, now, two holes are punched, say, in the first and ninth divisions of any one column, group $9^\times$ will be placed in communication with group $1^\times$ and a series of nine impulses will be produced in the register circuit containing the tell-tale register belonging to group $1^\times$ and the register will be advanced nine points instead of one. Upon observing the fact that the tell-tale register belonging to group $1^\times$ indicated nine points when it should have indicated but one the operator would know at once that a card having duplicate holes in one column has been acted upon, and that the holes were located in the first and ninth divisions of the column, because the tell-tale register or group $1^\times$ indicated eight points more than it should normally, and the increase (8) above the normal (1) added to the latter, indicates the hole of higher value in the column containing the one hole.

There are numerous ways in which the tell-tale registers can be connected up to do this work and adapted to operate with various styles of integrators and an illustration is given of a preferred plan in Figs. 4 and 10, wherein the tell-tale registers are shown arranged for operation with the two forms of integrator mechanism hereinbefore described. Referring first to Fig. 4, a separate branch circuit is provided for each tell-tale register, each branch including, when closed through contacts or bars $b^{10}$ $b^{11}$, one of the contacts or brushes $b^0$ $b^9$, a generator and a relay magnet $R^3$. These several branch circuits being connected to contacts or brushes $b^0$ to $b^9$, either directly or through the groups of contacts $0^\times$ $9^\times$ as shown, each receives through the integrator the same number of electrical impulses as its corresponding group of contacts $0^\times$ $9^\times$, that is to say, the branch connected to contact or brush $b^0$ and belonging to group of contacts $0^\times$ receives a single impulse (when in contact with bar $b^{11}$); the branch connected to contact or brush $b'$ and belonging to group of contacts $1^\times$ receives two impulses; and so on throughout the series, the branch connected to $b^9$ receiving ten impulses. It is to be remembered, however, that the first impulse transmitted through contact bar $b^{11}$ while the integrator is at rest, is not a counting but merely a starting impulse, hence it follows that the several branch circuits will be closed and the relay magnets $R^3$ energized at the same time that the relay magnets R and R' of the master and register circuits are energized, but the period during which the counting is effected begins after the integrator has started, the contact bar $b^{11}$ withdrawn and the circuit closer $r^5$ has placed the register circuits in connection with the battery or generator $r^8$. The magnets of the several tell-tale registers $R^5$ are placed in separate circuits or branches, each including the contacts $r^6$ of one of the relay magnets $R^3$, and the several tell-tale circuits or branches are placed in communication with the generator $r^3$ through the circuit closer $r^5$ after the contacts or brushes $b^0$ $b^9$ have passed the contact bar $b^{11}$. If the record card is properly punched, that is, has one hole in each column, every complete movement of the integrator will occasion the advance of each tell-tale register, with the exception of that one connected to group of contacts 0, as many points as there are produced electrical impulses in the group of contacts $1^\times$ to $9^\times$ to which it is connected, whether or not a register circuit is at the same time closed through the contacts of said group; and the passing of a number of record cards, say ten, through the switch mechanism will be indicated as 10 on the tell-tale register of group $1^\times$; 20 on tell-tale of group $2^\times$; 30 on tell-tale register of group $3^\times$; and so on through the series of tell-tale register of group $9^\times$ indicaitng 90 because during ten complete movements of the integrator 90 operative or counting impulses have been sent into group of contacts $9^\times$ through the contacts or bars $b^{10}$ of the integrator. Suppose the eleventh record card had two holes punched in one column, say the 0 and 9 in the first column, and one hole in every other column; the nine impulses sent through the group of contacts $9^\times$ would be transmitted to the branch circuit containing the relay magnet $R^3$ of the group of contacts $0^\times$ and the tell-tale register would indicate nine points, when it should not indicate any if the card were properly punched. If the record card contained holes in say the fourth and sixth divisions of one column, six impulses would be sent through the tell-tale register of group of contacts $4^\times$ and said telltale register would show forty-six points instead of forty-four, the two points above the normal indicating that the duplicate holes are in the fourth and sixth divisions of a column, the first indicated by the tell-tale register on which the irregular number is shown, and the second, by adding the excess, two, to the normal, four showing that the irregular registration was due to the connection formed between the fourth ($4^\times$) and sixth ($6^\times$) groups of contacts.

The described arrangement of tell-tale registers and circuits can be used in connection with the modified and improved integrator mechanism as represented in Fig. 10, wherein the circuits of the relay magnets are closed and remain closed a shorter or longer time according to the value or number of the digits, while the counting impulses are produced by the circuit breaker in the register circuits. In this case, the branch circuit containing the relay magnet of tell-tale register belonging to group $1^\times$ will be held closed while one impulse traverses the circuit of the tell-tale, after which said branch circuit will open and the relay contacts being separated the register circuit will be broken so that succeeding impulses in the register circuit will not affect the tell-tale register.

In the foregoing description, I have described a system employing electricity as the motive power for effecting the several connections through the switch mechanism and operating in the register circuits, but I do not desire to be limited strictly thereto as it is obvious that fluid pressure may be employed in lieu thereof as clearly indicated in my application, Serial No. 456,066, filed December 22, 1892. I would also state that the primary form of the system herein described and illustrated in Fig. 1, forms the subject of a separate application, to wit, application Serial No. 454,674, filed by me December 9, 1892, and the same is not herein claimed.

Having thus described my invention, I claim as new—

1. The combination of a switch mechanism controlled by a record card, a series of independent circuits each containing a relay and connected with said switch mechanism and a normally open independent local circuit including the circuit controlling devices of said relays arranged in series; substantially as described.

2. In a system, such as described, the combination with the controlling record card or strip, the switch mechanism and circuits controlled thereby, of a relay included in each switch circuit and a normally open master or starting circuit including a series of circuit controlling devices operated by the relays of the switch circuits.

3. In a system, such as described, containing an integrating mechanism, a switch mechanism controlling a plurality of circuits and a starting or master circuit, the combination therewith, of a series of relays controlled by the switch circuits and having their circuit controllers arranged in the master or starting circuit.

4. In a system, such as described, containing an integrating mechanism, a switch mechanism controlling a plurality of circuits and a starting or master circuit, the combination therewith of a series of relays controlled by the switch circuits and having their circuit controllers in the master or starting circuit and a device for setting in action the integrating mechanism controlled from the master or starting circuit.

5. In a system, such as described, the combination of the following elements: an integrating mechanism, a switch mechanism controlling a plurality of circuits, a motor; a master circuit, a detent mechanism controlled from the master circuit and a relay included in one of the switch circuits and having its circuit controller in the master circuit.

6. In a system, such as described, the combination of the integrating mechanism, a master or starting circuit, a motor, a detent mechanism provided with a magnet in the master circuit and a circuit including the magnet of the detent mechanism and a circuit closer operated by the integrator mechanism to effect a second movement of the detent mechanism.

7. In a system, such as described, the combination of the following elements, an integrating mechanism, a switch mechanism having two series of groups of contacts one of said series communicating with the integrator and the other with circuit connections containing relay magnets, a circuit closer such as the bar $b^{11}$, a detent mechanism for the integrator, a master or starting circuit including the magnet of the detent mechanism and the contacts of the relays, and a separate or branch circuit including the magnet of the detent mechanism and a circuit closer operated by the integrator mechanism.

8. In a system, such as described, the combination of a switch mechanism provided with two series of groups of contacts and a record card or strip controlling communication between the respective series of groups of contacts, a magnet connected to each group of contacts of one series and a switch, operating periodically to connect all the groups of the other series of contacts with the generator.

9. In a system, such as described, the combination of a switch mechanism provided with two series of groups of contacts and a record card controlling communication between the contacts of the two series, a relay magnet connected to each group of contacts of one series, an integrator mechanism controlling the flow of current through the circuits of the switch mechanism and a series of local register circuits each including the contacts of one of the relay magnets.

10. In a system, such as described, the combination of the integrator mechanism; the switch mechanism; the series of relays in circuit with the switch mechanism, a series of local register circuits each including the circuit controller of one of the relays and a circuit closer operated by the integrator mechanism to connect the local register circuits with a generator or source of power.

11. In a system, such as described, the combination of the switch mechanism provided with two series of groups of contacts and a record card; a series of relay magnets in circuit with the switch mechanism; an integrator mechanism controlling the flow of current through the circuits of the switch mechanism, a switch or bar for simultaneously and preliminarily closing all the circuits through the switch mechanism; and a series of local register circuits each including a relay contact and a circuit closer forming part of the integrator mechanism.

12. In a system, such as described, the combination of a switch mechanism adapted to be controlled by a record card, a series of relays connected to the switch mechanism; a series of local register circuits each controlled by one of said relays and an integrating mechanism controlling the transmission of current or power through the switch mechanism circuits and through the local register circuits respectively.

13. In a system, such as described, the combination of the following elements: a switch mechanism whose circuits are controlled by a record card; a series of relays connected to the switch mechanism; a series of local register circuits controlled by said relays; an integrator mechanism controlling the transmission of the current through the local register circuits and provided with a detent or starting mechanism; and a master circuit controlled by relays connected to the switch mechanism and operating upon the starting or detent mechanism to inaugurate the movement of the integrator mechanism when the switch mechanism circuits are closed.

14. In a system, such as described, the combination of the following elements: a switch mechanism comprising two series of groups of contacts and a record card; a series of relay magnets connected to one of the said series of groups of contacts; an integrator mechanism connected to the other of said series of groups of contacts and provided with means for simultaneously closing all of the several circuits through the switch mechanism; a series of local register circuits controlled by the said relay magnets and by the integrator mechanism; and a master or starting circuit for the integrator mechanism controlled by relays included in the several circuits through the switch mechanism.

15. In a system, such as described, the combination of the following elements; a switch mechanism whose circuits are controlled by a record card; a series of relays connected to the switch mechanism, a series of local register circuits controlled by said relays; an integrator mechanism controlling the passage of currents through the local register circuits; a detent mechanism for starting the integrator mechanism operating to arrest the integrator mechanism at intervals during one complete movement; a master or starting circuit controlled by relays connected to the switch mechanism and a separate or branch circuit controlling the detent mechanism and in turn controlled by the integrator mechanism, whereby after the integrator mechanism has been set in motion by the closing of the circuits through the switch mechanism it will be arrested before arriving at the starting point and held until the circuits through the switch mechanism are opened.

16. In a system, such as described, the combination of the following elements; a switch mechanism controlled by a record card; a series of relays connected to the switch mechanism; an integrator mechanism controlling the passage of current through the circuits of the switch mechanism and the relays; a series of local register circuits arranged in multiple arc with a generator circuit; and a circuit closer forming part of the integrator mechanism operating to complete the generator circuit.

17. In a system, such as described, the combination of the following elements; a switch mechanism controlled by a record card; two series of relays connected to the switch mechanism, an integrator mechanism controlling the passage of current through the circuits of the switch mechanism and the relays; a series of local register circuits arranged in multiple arc with a generator circuit, each of said local register circuits being controlled by one of the said relays; a master or starting circuit controlling the movements of the integrator mechanism and including the contacts of one of said series of relays arranged in series.

18. In a system, such as described, the combination of the following elements: a switch mechanism whose circuits are controlled by a record card, relays connected to the switch mechanism; an integrator mechanism and a master or starting circuit including two sets of contacts, the one controlled directly by the movement of the switch mechanism and the other by the relays.

19. In a system, such as described, provided with a switch mechanism an integrator mechanism, register circuits and a master or starting circuit for the integrator mechanism and in combination with said master or starting circuit, a mechanically operated circuit controller affected by the position of the record card and an electrically operated circuit controller in circuit with the switch mechanism, said circuit controllers cooperating to start the integrator mechanism.

20. In a system, such as described, the combination of a switch mechanism whose circuits are controlled by a record card, an integrator mechanism; a master or starting circuit controlling the movements of the integrator mechanism and two circuit controlling means connected to the master circuit one of said circuit controlling means being governed by the movement of the switch mechanism and the record card or strip and the other circuit controlling means being governed by the circuit connections of the switch mechanism.

21. In a system, such as described, the combination with the integrator mechanism and the switch mechanism, of a master or starting circuit for the integrator mechanism provided with a mechanically operated circuit controlling device and an electrically operated circuit controlling device, the former actuated by contact with the record card and the latter by the failure to close a circuit through the switch mechanism, to prevent the starting of the integrator mechanism.

22. In a system, such as described, the combination with the integrator, the switch mechanism whose connections are controlled by a record card and a master or a starting circuit through which the movements of the integrator mechanism are controlled of a contact carried by the movable section of the switch mechanism and included in the master circuit and a series of relay contacts also included in the master circuit and controlled by relays in the circuits of the switch mechanism.

23. In a system, such as described, the combination of the following elements; a series of register circuits; an integrator mechanism; a switch provided with two series of groups of contacts, the one connected to the integrator mechanism for controlling the production of different series of electrical impulses in the register circuits and the other connected to a series of relay magnets one for each register circuit; a master circuit through which the movements of the integrator mechanism are controlled, said master circuit containing two circuit controlling devices, the one operated directly by the movement of the switch mechanism and the other by the relay magnets; and a record card through which connection is made between the two series of groups of contacts of the switch mechanism, whereby, when the record card is properly placed between the members of the switch and the movable section of the latter is brought down, the circuit controller connected to the switch will close the master circuit at one point, and if the record card contains a hole in each column, the several relays will be operated to close the other circuit controlling device in the master circuit and start the integrator mechanism, but in case a card is not properly located or has not at least one hole in each column, the master circuit will not be completed and the integrating mechanism will be prevented from starting.

24. In a system, such as described, the combination of an integrator mechanism, a register circuit; a switch mechanism provided with a series of conductors, such as $b'$ to $b^9$ connected to the integrator and each adapted to control the production of a different series of electrical impulses in the register circuit, an opposing conductor having a series of contacts, such as one of the group of contacts 4 to 24 and a record card by means of which communication is established between any one or more of the series of conductors and the opposing series of contacts; and a series of tell-tale registers one for each of said series of conductors, adapted to register the number of impulses controlled by said conductors, whereby at each complete movement of the integrator, the tell-tale registers will each indicate the number of impulses controlled by its conductor or circuit, and in the event that two contacts are connected with two of the series of conductors the tell-tale register belonging to the conductor of lower value will receive the number of impulses controlled by the conductor of higher value thereby indicating a defective record card.

25. In a system, such as described, the combination of a series of register circuits; an integrator mechanism adapted to control the production of different numbers of impulses in the register circuits; a switch mechanism provided with two series of groups of contacts the one series connected with the integrator and each group of said series controlling the production of a different series of impulses in the register circuits, the other series of groups of contacts serving to connect any one or more of the contacts of the first series and to designate the register circuit in which the impulses are to operate, and a record card for controlling the connections between the said two series of contacts; and a series of tell-tale registers one for each of the first mentioned series of groups of contacts.

26. In a system, such as described, the combination of the following elements: a switch mechanism provided with two series of groups of contacts and a record card controlling communication between the contacts of the two series; a relay magnet connected to each group of one series of contacts; an integrator mechanism connected to the other series of groups of contacts and controlling the flow of current to the circuits of the switch mechanism, a series of local register circuits each controlled by one of the relays and a series of local tell tale circuits each controlled by a relay connected to one of that series of groups of contacts which is in communication with the integrator.

27. In a system, such as described, the combination of the following elements, an integrator mechanism; a switch mechanism; a relay in a circuit controlled by the switch mechanism; a master or starting circuit for the integrator mechanism, including a contact controlled by the relay of the switch mechanism; and a series of local tell tale register circuits controlled by relays connected to the switch mechanism.

28. In a system, such as described, the combination of the following elements, an integrator mechanism, a switch mechanism; a series of relays in the circuits controlled by the switch mechanism, a master or starting circuit for the integrator mechanism including the circuit controller of the relays arranged in series; a series of local register circuits; and a series of local tell-tale register circuits each controlled by a relay connected to the switch mechanism.

29. In a system, such as described, and in combination with an integrator mechanism, and a switch mechanism, the master or starting circuit provided with two circuit controlling devices the one operated mechanically by the switch mechanism and the other electrically through the circuits of the switch mechanism and the series of tell-tale registers controlled by the switch mechanism, whereby the starting of the integrator mechanism is prevented when the record card is incorrectly positioned, or not fully punched, and whereby also the overpunching of the card is indicated to the operator.

30. In a system, such as described, the combination of an integrating mechanism for producing different series of impulses, a series of register circuits, a switch mechanism for directing the transmission of any given series of impulses through any designated register circuit, and mechanism for automatically preventing the starting of the integrator mechanism when the record card of the switch mechanism is improperly placed or insufficiently punched.

31. A system, such as described, consisting of the following elements in combination, an integrating mechanism, a series of register circuits, a switch mechanism for directing the transmission of any given series of electrical impulses, through any given register circuit; mechanism for automatically starting the integrator when the record card is properly positioned and fully punched; and devices connected with the switch mechanism for indicating overpunching of the record card.

32. In a system, such as described, the combination with the switch mechanism, the series of relays connected to one section of the switch mechanism a record card or strip controlling the latter and the series of contacts or brushes connected to the other section of the switch mechanism of an integrator formed or provided with a conducting plate, such as $B^2$ of varying width in the direction of the motion of said plate operating to close the circuits through the switch mechanism during different intervals.

33. In a system, such as described, the combination with the switch mechanism, a series of relays connected to one section of the switch mechanism and a series of contacts or brushes connected to the other section of the switch mechanism of the integrator provided with a conducting plate, such as $B^2$, of varying width, a series of local register circuits each controlled by one of the relays and a circuit breaker moving in unison with the said conducting plate and operating to produce electrical impulses in the local register circuits.

34. In a system, such as described, the combination with the switch mechanism, and its record card, a relay in circuit with the switch mechanism, an integrator provided with a conductor, such as $B^2$, for closing the circuits through the switch mechanism, a local register circuit controlled by the relay a circuit breaker moving in unison with the integrator conductor operating to produce electrical impulses in the local register circuit when closed by its relay.

35. In a system, such as described, the combination with the switch mechanism and its record card, a relay in circuit with the switch mechanism, an integrator provided with a conductor for closing the circuits through the switch mechanism during different intervals, a local register circuit controlled by the relay, a series of local tell-tale register circuits each controlled by a relay connected to the switch mechanism, and a circuit breaker for transmitting electrical impulses through the local register circuits and local tell tale register circuits while the latter are held closed by their relays.

36. In a system, such as described, as a means for controlling the movements of the integrator, the combination with the latter, of the detent mechanism, comprising the two stops carried by the shaft of the integrator, the arm engaging said stops alternately, a master or starting circuit, a branch circuit, circuit controlling devices for said circuits and the magnet in the master or starting circuit, said magnet being energized to start the integrator by the closing of the master circuit and again energized before the integrator completes its movement by the closing of the branch circuit.

37. In a system, such as described, the combination with the integrator, of the detent mechanism comprising the two stops carried by the shaft of the integrator, the arm engaging said stops alternately, a master or starting circuit, a branch circuit, circuit controlling devices for said circuits, and the magnet in the master or starting circuit controlling the movement of said arm, said magnet operating to start the integrator when the master circuit is closed through the switch mechanism, and to stop the integrator by the automatic closing of the branch circuit just before the integrator completes its movement.

38. In a system, such as described, the combination of the switch mechanism and the integrator, of a motor, a detent mechanism, a master or starting circuit, including a magnet controlling the detent mechanism and contacts controlled by the switch mechanism, said magnet being operated by the closing of the master circuit to release the integrator and again operated by the closing of a second or branch circuit by the integrator to arrest the movement of the latter, said branch circuit including a contact connected to the switch mechanism and operating to open the circuit and permit the completion of the movement of the integrator upon the opening of the switch mechanism.

HERMAN HOLLERITH.

Witnesses:
J. C. STODDARD,
FRANK BARNARD.